United States Patent [19]

DuPont et al.

[11] Patent Number: 4,833,029
[45] Date of Patent: May 23, 1989

[54] HONEYCOMB FACESHEET MATERIAL AND HONEYCOMB MADE THEREWITH

[75] Inventors: Preston S. DuPont, Northridge; Robert E. Ritter, Palos Verdes Estates; Brian A. McGrath, Long Beach; Brent G. Schaffer, Redondo Beach; Kenneth A. Fouts, III, El Cajon; John P. Stafford, Placentia, all of Calif.

[73] Assignee: Hughes Aircraft Company, Los Angeles, Calif.

[21] Appl. No.: 943,470

[22] Filed: Dec. 19, 1986

[51] Int. Cl.$^4$ .............................................. B32B 3/12
[52] U.S. Cl. ..................................... 428/116; 428/408
[58] Field of Search ................ 428/116, 117, 118, 408

[56] References Cited

U.S. PATENT DOCUMENTS

| | | | |
|---|---|---|---|
| Re. 30,600 | 5/1981 | Long et al. | 428/118 X |
| 2,477,852 | 8/1949 | Bacon | 428/116 |
| 3,691,000 | 9/1972 | Kalnin | 428/114 |
| 3,864,169 | 2/1975 | Cestaro et al. | 428/138 X |
| 3,916,054 | 10/1975 | Long et al. | 428/117 |
| 3,973,991 | 8/1976 | Cestaro et al. | 429/178 X |
| 4,022,481 | 5/1977 | Long et al. | 428/118 X |
| 4,061,812 | 12/1977 | Gilwee, Jr. et al. | 428/117 |
| 4,064,207 | 12/1977 | De Crescente et al. | 428/280 X |
| 4,080,413 | 3/1978 | Layden et al. | 428/280 X |
| 4,189,531 | 2/1980 | Dubin | 428/408 X |
| 4,263,367 | 4/1981 | Prewo | 428/285 X |
| 4,284,457 | 8/1981 | Stonier et al. | 156/237 |
| 4,384,020 | 5/1983 | Beggs et al. | 428/116 X |
| 4,435,455 | 3/1984 | Prewo et al. | 428/367 X |
| 4,447,130 | 5/1984 | Christiansen et al. | 428/116 X |
| 4,671,841 | 6/1987 | Stephens | 428/116 X |
| 4,680,069 | 7/1987 | Weyts | 156/197 |
| 4,680,216 | 7/1987 | Jacaruso | 428/116 |

FOREIGN PATENT DOCUMENTS

| | | | |
|---|---|---|---|
| 0136096 | 2/1987 | European Pat. Off. | 428/116 |
| 1311202 | 3/1973 | United Kingdom | 428/116 |

*Primary Examiner*—Henry F. Epstein
*Attorney, Agent, or Firm*—Steven M. Mitchell; Mark J. Meltzer; A. W. Karambelas

[57] ABSTRACT

A honeycomb facesheet material, and honeycomb made therewith, wherein the facesheet includes a layer of graphite paper bonded to a layer of graphite cloth, woven from widely spaced graphite fibers. The facesheet is impregnated with an epoxy resin during manufacture, and the facesheet is bonded to an open end of the honeycomb under elevated pressure and temperature to effect curing of the epoxy resin. The graphite paper supports the layer of graphite cloth during handling to prevent misalignment of the fibers, and also effects a widely distributed bond between the fibers and the underlying honeycomb.

16 Claims, 1 Drawing Sheet

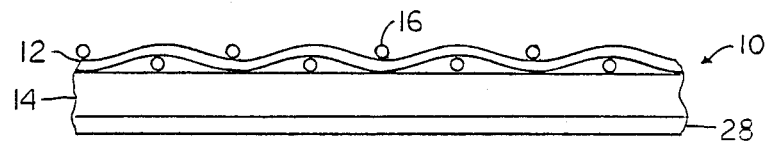
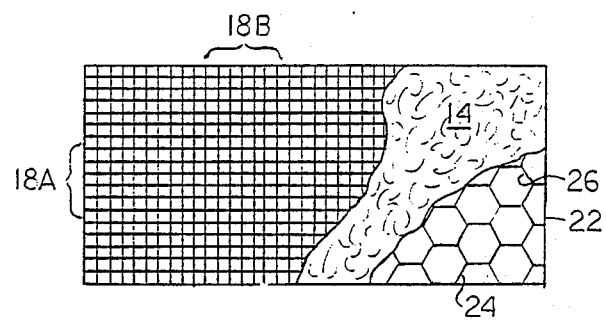
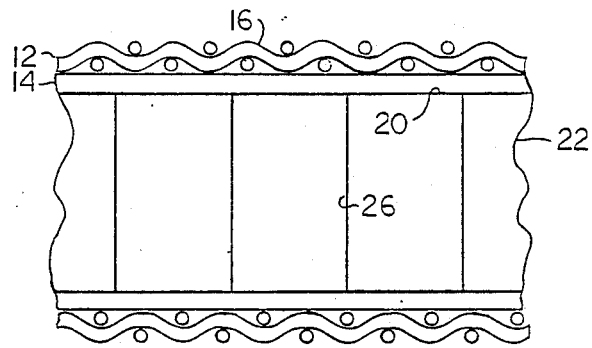

HONEYCOMB FACESHEET MATERIAL AND HONEYCOMB MADE THEREWITH

BACKGROUND OF THE INVENTION

This invention relates to composite reinforced structures, and, more particularly, to facesheets for stiffening metallic honeycombs.

Structural materials used in spacecraft and structures built in space must be stiff, strong, and extremely lightweight. The cost of raising one pound of weight from the earth to orbit is many thousands of dollars, and therefore great savings and increased payloads can be secured by precisely engineering structural materials to meet the required mechanical properties with minimum weight.

In some spacecraft applications, high structural stiffness at particular locations is required. Structural vibrations are induced in the spacecraft structural components. The amplitudes of the vibrations are dependent upon their frequencies, which in turn depend in part upon the stiffness of the structure. If the amplitudes become too high they can destroy the structure. The stiffness can be expressed in terms of the modulus of elasticity, a material property defined as the elastic stress divided by the elastic strain. To control the vibrations, the stiffness of the structure can be precisely controlled, within the limitation that the weight must be minimized.

Many spacecraft utilize solar cells for generating electrical power. The solar cells for typically thin plates that must be mounted upon an underlying solar panel structure for support. One approach to fabricating the underlying solar panel structure is to use a lightweight aluminum honeycomb substrate with a facesheet bonded to the open end of the honeycomb to stiffen the honeycomb and to receive the solar cells. Such a material can be tailored to a specific stiffness that is resistant to development of destructive vibrations in solar panels.

The aluminum honeycomb material is fabricated to a repeating cellular morphology similar to that of the familiar honeycomb of honeybees, except that the cell walls of the manmade material are of aluminum or other lightweight material. The cell walls are arranged in a hexagonal cellular pattern for geometric compatibility and strength. Typically, the cell walls are a lighweegit aluminum alloy such as 5056 aluminum about 0.0007 inches thick, and the maximum cross sectional dimension of each cell is about ⅜ inch. Such materials are commercially available in various thicknesses, and ½ inch thick pieces are often used in spacecraft solar panel construction.

The facesheet can be any of several materials. Most commonly, the facesheet is a tightly woven fabric of a synthetic fiber, such as Kevlar, having a high modulus of elasticity so that the facesheet and the honeycomb/facesheet structure are stiffened. While such structures do provide the necessary support and high stiffness, it would be desirable to find an alternative approach to the support structure that would have equivalent or improved structural properties, with even lower weight.

Accordingly, there exists a need for an improved lightweight structural material having high, controllable stiffness, dimensional stability, and reduced weight compared with existing materials. The structural material must be compatible with existing approaches to the mounting of the solar cells and their use, in the preferred application. More generally, the structural material would desirably be operable in a variety of spacecraft applications. The present invention fulfills this need, and further provides related advantages.

SUMMARY OF THE INVENTION

The present invention is embodied in a facesheet material for use with metallic honeycomb structures. The facesheet has high, controllable elastic modulus, low coefficient of thermal expansion, good dimensional stability, and reduced weight as compared with prior facesheet materials. The facesheet is particularly structured for use with honeycomb substrates, to enhance bonding of the stiffening elements to the honeycomb.

In accordance with the invention, a honeycomb facesheet material comprises a woven graphite cloth having interwoven graphite fibers of an average spacing between fibers of at least the diameter of the fibers; and a piece of graphite paper adhered to said graphite cloth, said cloth and said graphite paper being impregnated with a curable adhesive.

The graphite fibers preferably have a diameter of about 0.020 inches, and a spacing between fibers of about 0.080 inches. Thus, the fibers are arranged in an open weave of about 10 fiber ends per inch. The fibers preferably are of high modulus, as on the order of about 70 million pounds per square inch. Because the cross sectional dimension of each cell of the honeycomb (e.g., 0.375 inch) is large, and the spacing between fibers (e.g., 0.080 inches) is extreme, the fibers of the cloth would not readily bond to the cell walls over a large fraction of their lengths, in the absence of the graphite paper. Indeed, only a small fraction of the fiber lengths would contact the ends of the cell walls in the absence of the graphite paper, so that load transfer between the cell walls and the fibers would be incomplete, resulting in poor mechanical properties.

The graphite paper between the graphite cloth and the honeycomb material therefore performs several important functions. The paper is a bonding element that aids in achieving full bonding of the fibers of the open-weave cloth to the thin cell walls. The graphite paper prevents the cell walls of the honeycomb from cutting or otherwise damaging the fibers. The graphite paper assists in supporting the open-weave cloth structure during fabrication, transport, and application to the honeycomb, preventing misalignment of the spaced graphite fibers and unraveling of the cloth.

The graphite fiber is preferably a commercial product purchased as Celion ® brand GY7OSE carbon fiber. The fiber is then woven into the desired cloth. The graphite paper is preferably a commercial product purchased from International Paper Co. in weights of from about 0.2 to about 2.0 ounces per square yard, most preferably 0.3 ounces per square yard. The graphite paper is formed of pressed graphite fibers having lengths typically of about 0.75 to about 1.0 inch.

The flexural modulus of a honeycomb having the facesheet of the invention is typically about 40% greater than obtained using a single-ply facesheet of Kevlar. The weight of the facesheet is about 25% less using the graphite cloth/graphite paper two-ply approach of the present invention, instead of the single-ply Kevlar approach. Thus, it is expected that a reduction in weight of about 20 to 30 pounds can be achieved by using the present facesheet material and honeycomb structure in a Hughes Aircraft Co. HS-933 communications satellite.

It will now be apparent that the facesheet and reinforced honeycomb of the present invention provide an important advance in the art of stiff, lightweight structural materials for use in spacecraft. Higher stiffness, better dimensional stability, and lighter weight are obtained by using the present two-ply approach in place of the prior single-ply approach. Other features and advantages of the present invention will be apparent from the following more detailed description, taken in conjunction with the accompanying drawings, which description illustrates, by way of example, the principles of the invention.

BRIEF DESCRIPTION OF THE DRAWINGS

FIG. 1 is a side sectional view of a facesheet of the invention;

FIG. 2 is a top plan view, with layers progressively stripped away to illustrate their relation, of a honeycomb reinforced with the facesheet of the invention; and FIG. 3 is a side sectional view of a honeycomb reinforced with the facesheet of the invention.

DETAILED DESCRIPTION OF THE PREFERRED EMBODIMENT

As illustrated in FIGS. 1 and 2, a facesheet 10 includes a layer of woven graphite cloth 12 and a layer of graphite paper 14 adhered thereto. The graphite cloth is an open weave of graphite fibers 16, each of a diameter of about 0.020 inch. The fibers 16 are spaced about 0.080 inches apart, so that the centers of the fibers are about 0.100 inches apart. The weave is formed of two sets 18 of fibers 16, with all of the fibers in each set 18 substantially parallel to each other, and one of the sets 18a disposed at 90 degrees to the other set 18b. In each direction perpendicular to the fiber sets 18 but in the plane of the cloth 12, there are about 10 fiber ends per inch. This type of weave of cloth, wherein the fibers are spaced apart laterally by a distance larger than their diameters, is termed an open weave. A common example of an open weave is screening used on windows and doors. In a closed weave, by contrast, the fibers are closely spaced together without much lateral spacing therebetween. A common example of a closed weave is the cloth used in clothing.

The fibers 16 in the cloth 12 are graphite, a form of carbon. Each fiber in turn is a bundle or tow of filaments of graphite, with typically about 384 filaments bundled to form each fiber. The fibers have a high modulus of elasticity, on the order of about 70 to about 80 million pounds per square inch. Such fibers are commercially available as Celion ® brand GY7OSE carbon fibers. They are woven into the desired open weave cloth on weaving machines generally similar to those used to manufacture cotton cloth used in clothing.

The use of an open weave graphite cloth is important to the present invention. The cloth 12 having 10 ends per inch of GY7OSE graphite fiber is found to yield the desired high stiffness to the facesheet 10. An open weave fo a fiber weighs less than a closed weave, and the open weave cloth 12 of the present invention also contributes to the intended reduction of weight of the structure. A more closed weave of the fibers would contribute to a higher stiffness of the facesheet 10 and the final structure, but such higher stiffness is not required by the spacecraft specifications. Instead, the construction of spacecraft structure requires a material having an optimal combination of sufficient stiffness with as low a weight as possible.

The graphite paper 14 is a pressed mass of graphite fibers, each typically about 0.75 to about 1 inch long. The thickness of the graphite paper is about 0.003 inches. The graphite paper is manufactured in a manner similar to the more familiar paper made from wood pulp, so that the graphite fibers are generally randomly oriented in the plane of the paper. Graphite paper can be manufactured in a range of weights, and is available commercially from International Paper Co. in weights of from about 0.2 to about 2.0 ounces per square yard. A paper having a weight of about 0.3 ounces per yard has been found satisfactory for use in the facesheet 10.

The use of the graphite paper 14 in combination with the open weave graphite cloth 12 is critical to attaining the improved stiffness and reduced weight required for the facesheet 10. After the open weave structure of the graphite cloth 12 was determined to be operable for use in attaining the desired stiffening, it was found that such an open weave cloth cannot be bonded directly to the honeycomb in a satisfactory manner.

FIG. 2 illustrates the relative scale of the spacing of the fibers 16 in the fiber sets 18 that make up the graphite cloth 12, in respect to an open end 20 of a honeycomb 22. As is apparent, the scale of each cell 24 of the honeycomb 22 in relation to the scale of the spacing between the fibers 16 is very great. Consequently, only a small length of each fiber 16 could be expected to contact a portion of a wall 26 of the cell 24 and be bonded thereto, in a series of spaced-apart contact points. This low degree of bonding leads to poor mechanical performance of the honeycomb and facesheet composite, because loads cannot be readily transferred between the two elements of the composite.

The graphite paper 14, interposed between the graphite cloth 12 and the open end 20 of the honeycomb 22, acts to distribute loads transferred between the cloth 12 and the honeycomb 22. The paper 14 is bonded to the exposed portion of the cell walls 26 essentially along their entire length, achieving a more effective transfer of loads than can be achieved by spaced-apart point contacts. The graphite paper also contacts the fibers 16 of the graphite cloth 12 over substantially their entire lengths, again promoting an effective load transfer between the paper 14 and the cloth 12. The graphite paper 14 is therefore an important structural, load transferring element of the facesheet 10. The graphite paper 14 prevents the sharp edges of the cellwalls 26 of the honeycomb 22 from cutting, nicking, or otherwise damaging the fibers 16. The strength of the fibers can be drastically reduced by even small amounts of damage, and the paper 14 between the fibers 16 and the honeycomb 22 prevents such damage. Being fabricated of graphite, the paper 14 is chemically compatible with the graphite cloth 12, has about the same low coefficient of thermal expansion to reduce thermal mismatch stresses and strains upon heating and cooling, and has the same low density.

The graphite paper 14 also performs an important function in supporting the graphite cloth 12 during manufacturing and handling. An open weave structure is susceptible to shifting of the individual fibers 16 of the weave, whereby the fibers would become misaligned or even might fray away from the body of the cloth at the edges. The presence of the graphite paper 14 reduces shifting and fraying as the facesheet 10 is manufactured, and as the facesheet is handled during application to the honeycomb 22.

During manufacture of the facesheet material, the graphite cloth 12 and the graphite paper 14 are impregnated with a suitable adhesive, preferably a curable epoxy, polysulfide, or polyimide resin. The epoxy resin adhesive is supplied as a viscous liquid that is impregnated into the facesheet 10. The adhesive helps to adhere the cloth 12 to the paper 14 to prevent shifting of the fibers 16 during manufacture, transport and application to the honeycomb 22, since the adhesive has some tackiness even before curing. After the facesheet 10 is applied to the honeycomb 22, the adhesive is cured under conditions proper to the adhesive chosen, to form a strong bond between the facesheet 10 and the honeycomb 22.

The strength of the bonding increases with increasing amounts of adhesive, but the weight also increases. It is preferred to use an adhesive that is sufficiently viscous to have a low flow rate at ambient and curing temperatures, to prevent the resin from flowing into the cells 24 of the honeycomb 22. Fiberite 984 curable epoxy resin adhesive has been found to be satisfactory for this application. The adhesive is impregnated into facesheet 10 in an amount of about 2.4 to about 2.6 ounces per square yard during manufacture of the facesheet 10 as a separate material from the honeycomb 22. Release paper 28 is normally incorporated during facesheet impregnation to prevent adhesive contact of the facesheet material to itself as the material is rolled up during manufacture. This protects the facesheet during transfer and storage before the facesheet is applied to the honeycomb.

Later, the stiffened honeycomb 22, illustrated in FIG. 3, is manufactured by stripping away the release film 28 and then placing the facesheet 10 onto the open end of the honeycomb 22, with the graphite paper 10 disposed downwardly against the honeycomb 22. The adhesive is cured using standard procedures applicable to that adhesive, to bond the facesheet together and to the honeycomb. In the case of the preferred Fiberite 984 adhesive, curing is accomplished by vacuum bagging the facesheet and honeycomb and curing at a temperature of 350° F. and a pressure of about 2 to about 5 pounds per square inch, for a period of about two hours. This process is termed cocuring, since the adhesive that forms the bond between the facesheet 10 and the honeycomb 22 is part of the adhesive that was impregnated into the facesheet.

In an alternative process termed precuring, the epoxy in the facesheet 10 is fully cured prior to joining the facesheet 10 to the honeycomb 22. Another layer of adhesive is placed between the precured facesheet 10 and the honeycomb 22, and the layer of adhesive is cured using procedures proper for it. This approach has an advantage of applying a higher concentration of adhesive at the bond plane between the facesheet 10 and the honeycomb 22, if it is found in particular applications that there is insufficient bonding using the cocuring approach. The amount of adhesive initially impregnated into the facesheet 10 can be reduced as needed when practicing the precuring approach, so that the total amount of adhesive used is that required to bond the elements together effectively.

In either approach (precure or cocure), the facesheet material can be prepared as one-, two-, or multi-ply layers of facesheet material ready for application to the honeycomb. More than one of these layers are applied to the honeycomb if increased stiffening is required. That is, there can be a number of plies bonded to the honeycomb in one bonding operation. Extra layers of adhesive can be added as needed, so that the process is highly flexible and can be tailored to specific needs for particular applications.

A number of test samples were prepared in the manner just described. One, two, or three layers of the facesheet prepreg were bonded to each side of ½ inch thick pieces of honeycomb having a ⅜ inch cell dimension and walls fabricated of 5056 aluminum alloy. Graphite doublers were bonded to the grip portions of each sample to ensure failure within the central portion. The product of the flexural modulus and the facesheet sheet thickness, Et, was measured in each case in four-point bending. The strength of the facesheets was also determined.

For a single layer of facesheet on each side of the honeycomb, the average value of Et was 22,189 pounds per inch of width and the average strength was 19.6 pounds per inch of width (values averaged over 45 tests). For two layers of facesheet on each side of the honeycomb, the average value of Et was 42,192 pounds per inch and the average strength was 56.2 pounds per inch (values averaged over 18 tests). For three layers of facesheet on each side of the honeycomb, the average value of Et was 74,004 pounds per inch and the average value of strength was 60.3 pounds per inch (values averaged over 13 tests). For comparison, the average Et value for a single layer of Kevlar bonded to the honeycomb is about 16,000 pounds per inch, significantly below the 22,189 pounds per inch average of the material of the present invention. Strength values for the Kevlar material are superior to those of the present material, but the critical consideration in the present application is stiffness, not strength.

Thermal expansion and thermal cycling tests were conducted to determine whether the honeycomb stiffened with the facesheet of the invention is acceptable for use in spacecraft solar panels, which are cycled many times during their lifetimes. The thermal testing confirmed that the present material has acceptable performance for use in spacecraft.

The facesheet and facesheet/honeycomb materials of the present invention provide increased stiffness and acceptable strength in spacecraft applications, with decreased weight. Although a particular embodiment of the invention has been described in detail for purposes of illustration, various modifications may be made without departing from the spirit and scope of the invention. Accordingly, the invention is not to be limited except as by the appended claims.

What is claimed is:

1. A honeycomb facesheet material, comprising:
   a woven graphite cloth having interwoven graphite fibers of an average spacing between fibers of at least the diameter of the fibers; and
   a piece of graphite paper adhered to said layer of graphite cloth, said cloth and said grpahite paper being impregnated with a curable adhesive.

2. The facesheet material of claim 1, wherein said fibers have a modulus of elasticity of from about 70 to about 80 million pounds per square inch.

3. The facesheet material of claim 1, wherein each of said fibers comprises a plurality of filaments of graphite.

4. The facesheet material of claim 1, wherein the diameter of said fibers is about 0.020 inches and the spacing between said fibers is about 0.080 inches.

5. The facesheet material of claim 1, wherein the weight of said graphite paper is from about 0.2 to about 2.0 ounces per square yard.

6. The facesheet material of claim 1, wherein the weight of said graphite paper is about 0.3 ounces per square yard.

7. The facesheet material of claim 1, wherein said curable adhesive is selected from the group consisting of an epoxy resin adhesive, a polyimide adhesive, and a polysulfone adhesive.

8. A honeycomb facesheet material, comprising:
a layer of woven graphite fibers having about 10 fibers per inch in each direction perpendicular to the fibers in the plane of the cloth, the modulus of elasticity of said fibers being from about 70 to about 80 million pounds per square inch;
a layer of graphite paper having a weight of about 0.3 ounces per square yard adhered to said layer of fibers, said fibers and said cloth being impregnated with epoxy resin.

9. A stiffened honeycomb material, comprising:
a piece of metallic honeycomb material;
a piece of graphite paper bonded to one face of said honeycomb; and
a woven graphite cloth having woven graphite fibers of an average spacing between fibers of at least the diameter of the fibers, said cloth being bonded to said graphite paper.

10. The stiffened honeycomb material of claim 9, wherein said fibers have a modulus of elasticity of about 70 million pounds per square inch.

11. The stiffened honeycomb material of claim 9, wherein each of said fibers comprises a plurality of filaments of graphite.

12. The stiffened honeycomb material of claim 9, wherein the spacing between fibers is about 0.080 inches.

13. The stiffened honeycomb material of claim 9, wherein the weight of the graphite paper is from about 0.2 to about 2.0 ounces per square yard.

14. The stiffened honeycomb material of claim 9, wherein the weight of the graphite paper is about 0.3 ounces per square yard.

15. The stiffened honeycomb material of claim 9, wherein a plurality of pieces of graphite paper and a plurality of graphite cloths are bonded to a single honeycomb material.

16. The stiffened honeycomb material of claim 15, wherein a piece of graphite paper is bonded to each face of said honeycomb, and a piece of graphite cloth is bonded to the exposed face of each piece of graphite paper.

* * * * *